United States Patent [19]

Wladika et al.

[11] 4,263,798
[45] Apr. 28, 1981

[54] METHOD OF OPERATING A WIDE BAND HOT ROLLING MILL

[75] Inventors: Hans Wladika; Theodor Sevenich, both of Dortmund, Fed. Rep. of Germany

[73] Assignee: Hoesch Werke Aktiengesellschaft, Dortmund, Fed. Rep. of Germany

[21] Appl. No.: 973,924

[22] Filed: Dec. 28, 1978

Related U.S. Application Data

[63] Continuation of Ser. No. 756,708, Jan. 4, 1977, abandoned.

[51] Int. Cl.³ .................... B21B 1/26; B21B 9/00
[52] U.S. Cl. .................................................... 72/202
[58] Field of Search ............... 72/200, 202, 227, 228, 72/229, 231

[56] References Cited

U.S. PATENT DOCUMENTS

| 370,524 | 9/1887 | Beach | 72/202 |
| 379,974 | 3/1888 | Morgan | 72/228 |
| 407,177 | 7/1889 | Daniels | 72/202 |
| 429,425 | 6/1890 | Daniels | 72/202 |
| 1,771,688 | 7/1930 | Nye | 72/202 |
| 1,957,009 | 5/1934 | Broemel | 72/202 |

FOREIGN PATENT DOCUMENTS

| 2100088 | 7/1972 | Fed. Rep. of Germany | 72/202 |
| 85039 | 10/1971 | German Democratic Rep. | 72/202 |
| 460866 | 2/1937 | United Kingdom | 72/202 |

Primary Examiner—Ervin M. Combs
Attorney, Agent, or Firm—Becker & Becker, Inc.

[57] ABSTRACT

A hot rolling mill and a method of operation to reduce scrap upon failure of a portion of the mill in which a first furnace device is provided adapted to receive and reel up a strip which is ready to go to the finishing section of the mill and a second furnace device is provided to receive a strip of material being rolled in the roughing section of the mill without reeling up, while both furnace devices maintain the material therein at working temperature and in continuous motion.

2 Claims, 6 Drawing Figures

METHOD OF OPERATING A WIDE BAND HOT ROLLING MILL

This is a continuation of application Ser. No. 756,708, filed Jan. 4, 1977, abandoned.

The present invention relates to a method for reducing the amount of scrap caused by disorders in hot band rolling mills, especially in continuous hot band rolling mills in which the hot band is rolled out to a pre-band (Vorband) in a roughing or shaping train to the intake thickness for a subsequent finishing train. The invention furthermore relates to a hot band rolling mill for practicing this method in a continuous manner. Such hot band rolling mill comprises primarily a pusher furnace, a roughing or shaping train which in rolling direction follows the pusher furnace and is provided with a scale washer and roughing stands, a finishing train with scale washer, topping shears (Schopfschere) and finishing stands as well as reels and roller beds interconnecting the individual stations of the rolling mill while between the roughing or shaping train and the finishing train there is arranged a band withdrawing device adjacent the roller bed.

In continuously operating hot band rolling mills, more or less frequently disorders will occur during which the rolling operation has to be interrupted. The material which at the time of the disorder has been entirely or partly rolled out has then to be removed from the rolling train and can no longer be treated as first quality material, while a considerable portion of this material will have only scrap value. If the disorder is of the kind caused at the reels, for instance caused by a stuck or jammed leading end of a band, there will be a total of three slabs in the rolling process of a continuous hot band train, which means the financial loss will be considerable although caused by only a single disorder.

Considering the fact that in hot band rolling mills between the roughing train and the finishing train there is provided only a band withdrawing device adjacent the rolling bed for a fast removal of a portion of the pre-band and that besides the hall cranes no further devices are present for removing the further rolling goods from the rolling train, it will be evident that considerable time is required to put the rolling train back into full operation following a disorder.

From German Offenlegungsschrift No. 2,256,024 and German Offenlegungsschrift No. 2,256,030 it has become known to provide a winding device ahead of the topping shears of the finishing train when looking in rolling direction. Such winding device has been provided to increase the binding weights. At the same time this known winding device, onto which a pre-band is wound up in rolling out direction and is wound off in the same direction, is intended during disorders of the rolling train to store the slab rolled out to a pre-band until the disorder has been remedied. However, inasmuch as the winding device is all the time occupied by a pre-band during the rolling process, it is not possible that when a disorder suddenly occurs, for instance at the reels, the pre-band just leaving the roughing train is likewise received by the winding device. Therefore, this known device cannot meet the requirement as described above. Aside therefrom, it should be noted that at least with fully continuous or ¾-continuous hot band trains there is still a further slab present in the rolling train, namely in the first roughing stand of the roughing train.

It is, therefore, an object of the present invention to provide a method of and a rolling mill for carrying out the method by means of which the drawbacks of the heretofore known methods and devices will be avoided in a simple manner and by means of which the loss in material during disorders in hot band trains as well as the duration of the disorders, and last but not least the loss in output, will be reduced to a minimum.

These and other objects and advantages of the invention will appear more clearly from the following specification in connection with the accompanying drawings, in which:

FIG. 1 diagrammatically illustrates a fully continuous hot band train.

The method according to the present invention is characterized primarily in that the pre-band is moved back to the roughing train in the direction counter to the rolling direction, is wound up and held at rolling temperature, and is furthermore characterized in that a pre-slab already rolled in at least one pass is held at rolling temperature.

According to a further development of the method according to the invention the wound up pre-band and the pre-slab are, while being held in hot condition, moved so that a uniform heating through of the rolling material will be obtained.

The continuous rolling mill which is best suited for practicing the method according to the invention is in conformity with the present invention built up in such a way that within the roughing train in rolling direction ahead of the last roughing stand there is provided a holding furnace with a winding device, that further a roller hearth-type furnace is provided for receiving a pre-slab rolled out in at least one pass, and that in the last roughing stand the lower working roller and the lower supporting roller are adapted to be lowered. According to a preferred design, the holding furnace comprises a disengageable hood provided with a refractory heat insulating lining and resting above the roller bed on a frame provided with a band inlet opening.

According to a preferred embodiment of the invention, the roller hearth type furnace is arranged within the roughing train between the first roughing stand and the second roughing stand adjacent the roller bed which is located between the roughing stands. If for reasons of space such an arrangement is not possible, the roller hearth type furnace may be expediently arranged at the end of the roller bed ahead of the first pusher furnace.

In order to be able to keep the rolling material, which means the wound up shaped band and the slab already rolled in at least one pass, for a longer period of time in the furnace, all rollers in the holding furnace and in the hearth type furnace are made of refractory material while their axles are cooled, preferably water cooled.

Figure 1:
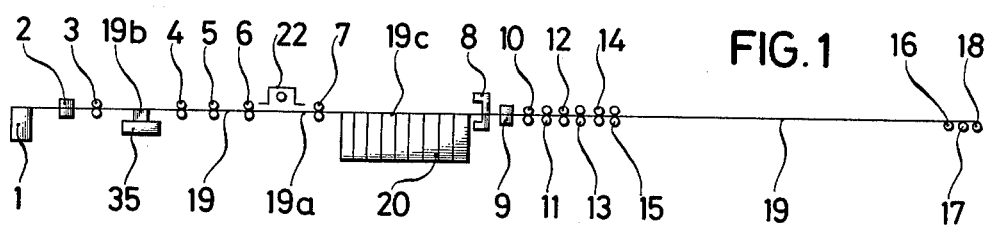

Referring now to the drawings in detail, FIG. 1 shows a fully continuous hot band trains, which comprises pusher furnaces 1 (one only being shown) and furthermore comprises the following units which are arranged one behind the other in the rolling line: the scale washer 2, the roughing stands 3–7 of the roughing train, the additional scale washer 8, the topping shears 9, the finish stands 10–15 of the finish train, the reels 16–18, and the roller beds 19. In addition to the roller beds 19, between the last roughing stand of the roughing train and the scale washer 8 arranged ahead of the topping shears 9 there is provided a band withdrawing device 20 by means of which one portion of a roughing band can be withdrawn from the roller bed 19 which during disorder for instance in the reels 16–18, is still located outside the first finish stand 10 and has been cut off by the topping shears 9.

Figure 2:
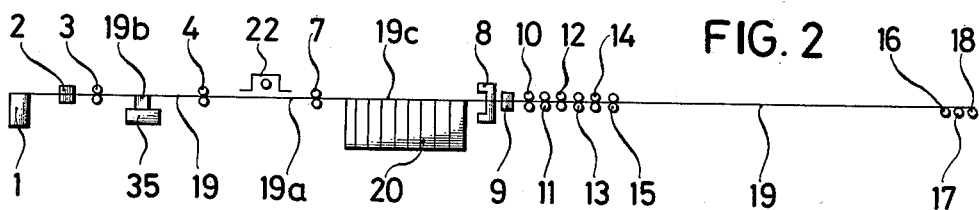
FIG. 2 is a diagrammatic illustration of a ¾-continuous hot band train.

The ¾ continuous hot band train according to FIG. 2 differs from the fully continuous train according to FIG. 1 as to its construction merely in that only three roughing stands 3, 4, and 7 have been provided while the intermediate roughing stand 4 has been designed as reversing stand.

The roughing stand according to FIGS. 1 and 2 is equipped with a so-called back pass device by means of which the lower working roll and the lower supporting roll can be lowered.

Figure 3:
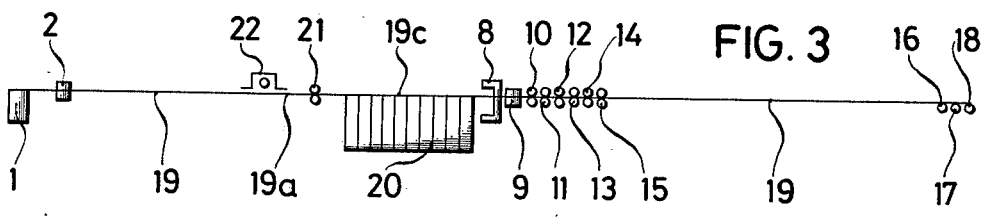
FIG. 3 is a diagrammatic illustration of a half-continuous hot band train.

In a corresponding manner, with a semi-continuous hot band train according to FIG. 3, the only roughing stand of the roughing train is designed as reversing stand 21.

Figure 4:
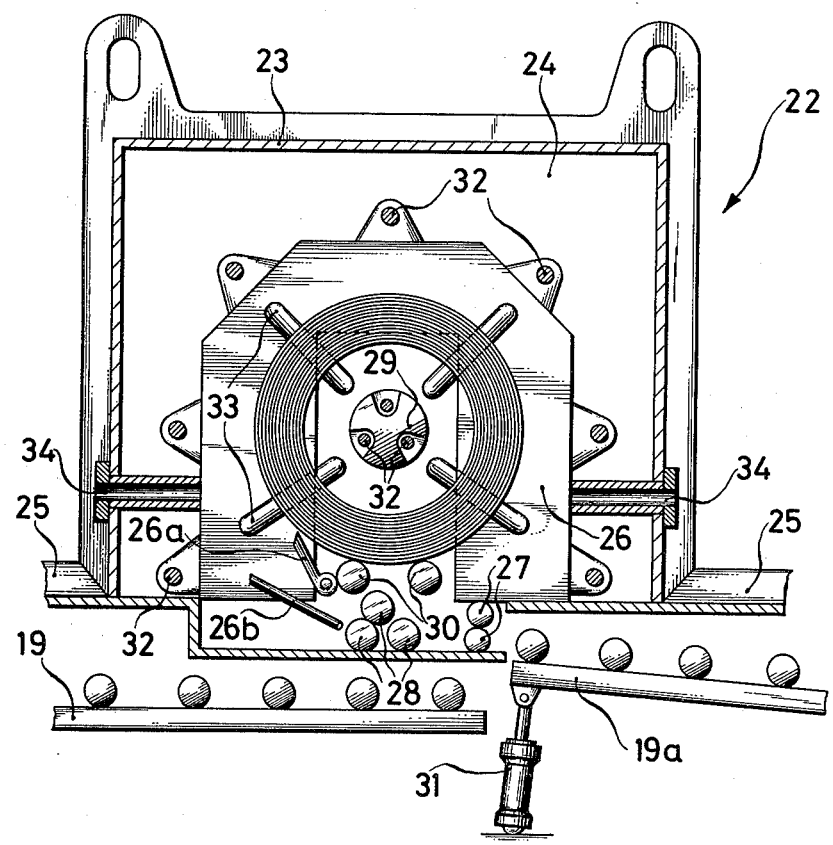
FIG. 4 illustrates a side view partly in section of a holding furnace with winding device for use in connection with the present invention.

According to the embodiments of hot band trains according to FIGS. 1–3, within the roughing train starting with the scale washer 2 and ending with the last roughing stand 7, 21, and more specifically in the rolling direction ahead of the roughing stand 7, 21 there is provided a hot keeping furnace 22 with a winding device according to FIG. 4. The furance 22 according to FIG. 4 comprises a detachable hood 23 which is equipped with a refractory heat insulating lining 24 and rests on a frame 25 which is mounted above the roller bed 19 and is provided with a frame 25 having an inlet opening. In a support 26 arranged on the frame 25 there is provided a winding device which comprises a rotatable mandrel 29 and a driven supporting roller pair 30. The mandrel 29 serves exclusively for centering the bundles in the furnace 22 and does not take part in the winding operation. A side wall of the hood 23 is expediently designed as door in order if necessary to remove a bundle.

If a disorder occurs in a hot band train, the band in the finishing train is removed in a manner known per se by means of the band withdrawing device 20 or the crane, and the roughing slab in the roughing train is in customary manner finished rolled to the roughing thickness required for the finishing train. After leaving the last roughing stand 7, 21 as seen in rolling direction, the roughing band is by means of the roughing stand 7, 21 moved backwards counter to the rolling direction. To this end, advantageously the rollers of the roller bed section 19c between the topping shears 9 and the hot holding furnace 22 are reversible in their direction of rotation. The roughing band passes via the roller bed section 19a which is adapted to be lifted and lowered by means of a cylinder piston system 31, through the driving roller pair 27 into the three-roller bending unit 28 in which it is bent upwardly around the mandrel 29 and is subsequently wound up. The finish wound roughing band is supported by the supporting roller pair 30 and during its staying time in the hot keeping furnace is slowly turned for instance at a speed of 0.5 rpm.

Heating bodies 32 are arranged in the refractory lining 24 of the hood 23 and also in the rotatable mandrel 29, said heating bodies being uniformly distributed about the axis of the mandrel and arranged in recesses. Further heating bodies 33 are arranged ahead of the two end faces of the wound up roughing band in the side walls of the furnace. As soon as a disorder occurs in the rolling mill, the heating bodies 32, 33 designed as radiation or induction heating bodies are turned on, and the band is kept at rolling temperature, in order to prevent a scaling of the roughing band surface in the hot keeping furnace 22, the interior of the furnace is for the band staying time filled with inert protective gas, for instance nitrogen. To this end, in the hood 23 filling connections 34 as well as a non-illustrated closure flap for the inlet opening are provided on frame 25.

For purposes of unwinding the roughing band from the hot keeping furnace 22, the supporting block 26 has connected thereto a pivotable wedge 26a as well as a guiding rail 26b. By means of the wedge 26a, the leading end of the band is lifted off from the bundle and is introduced by the guiding rail 26b into the three-roller bending unit 28.

When a disorder occurs within the region of the reel 16–18, in a full and also a ¾ continuous hot band train, the third slab being processed is just subjected to the first pass in the roughing stand 3. For purposes of keeping this slab for the time period of the disorder in the rolling mill, there is provided a roller hearth-like furnace 35 according to FIGS. 5 and 6 between the first roughing stand 3 and the second roughing stand 4, said furnace 35 being arranged adjacent the roller bed section 19b.

Figure 5:
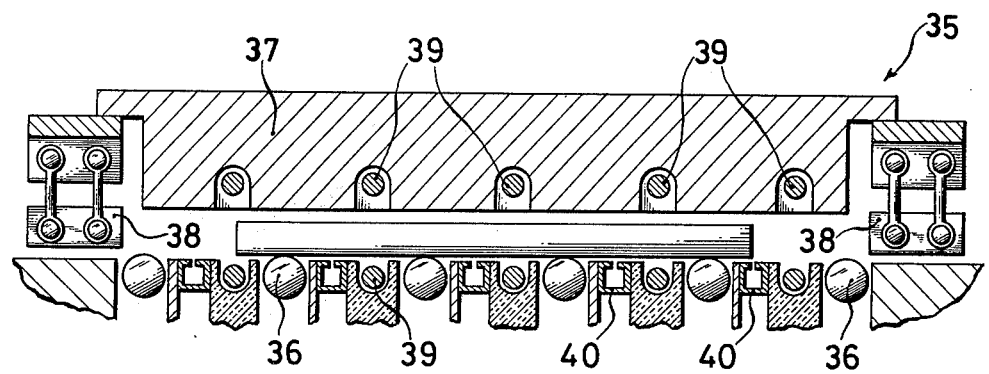
FIG. 5 is a section through a roller hearth type furnace for use in connection with the present invention.
Figure 6:
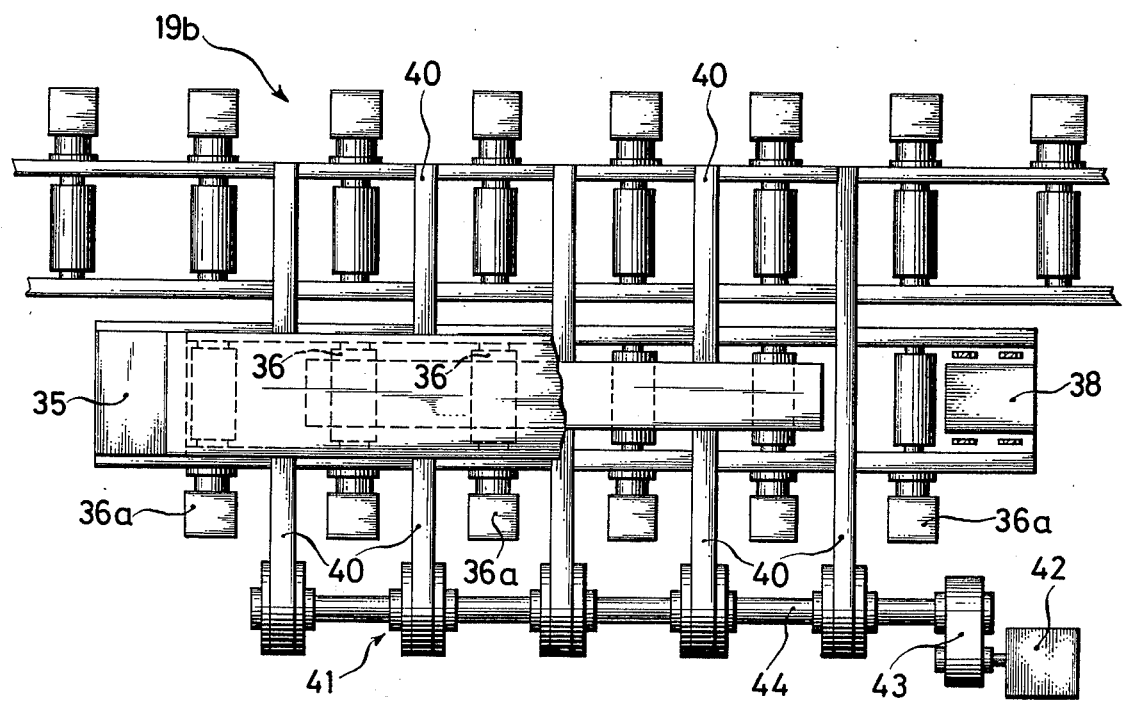
FIG. 6 shows the arrangement of a roller hearth type furnace in connection with a roller bed.

As will be seen from FIG. 5, the roller hearth-like furnace 35 comprises primarily the rollers 36 arranged in the furnace bottom, and driven and cooled by motors 36a, and furthermore comprises the detachable furnace cover 37 and the laterally arranged pendulum pushers (vorstössen) 38. In the furnace cover 37 as well as in the furnace bottom, heat bodies 39 are provided in recesses. Between the rollers 36, guiding means 40 of a hook dragging device 41 are arranged which are introduced into the roller bed section 19b and are arranged between two roller bed rollers. By means of the hook dragging device 41, the slab which in the roughing stand 3 has received the first pass is by means of roller bed section 19b pulled into the roller hearth-like furnace 35.

The hook dragging device 41 (FIG. 6) comprises a motor 42 and a transmission 43 with a shaft 44 by means of which the non-illustrated hook dragging means is synchronously moved for instance by chains or cables.

During the stay of the slab in the roller hearth-like furnace 35 while the furnace is provided with a protective gas filling, the heating bodies 39 are turned on which are likewise designed as radiation or induction heating bodies. During this time, the slab is within the furnace 35 subjected by rollers 36 to a reciprocatory pendulum movement.

After the disorder in the rolling mill has been remedied, first the roughing band kept at the rolling temperature is again unwound from the hot keeping furnace 22 into the rolling direction and by means of the roughing stand 7, 21, is fed to the finishing stands 10–15 for a further rolling operation. In the meantime, the slab kept hot in the roller hearth-like furnace 35 is by means of the hook dragging device 41 again moved onto the roller bed section 19b and directly subsequently thereto is rolled further in the roughing train.

As will be evident from the above, the advantages of the method and hot band rolling mill according to the invention consist primarily in that in a simple manner, the loss in material during disorders in the hot band trains, the duration of the period of disorder, and the loss in output can be reduced to a minimum.

It is, of course, to be understood that the present invention is, by no means, limited to the specific showing in the drawings, but also comprises any modifications within the scope of the appended claims.

What is claimed is:

1. In a process which includes operation of a wide band, hot rolling mill line in which a band of metal at an elevated temperature is produced from a slab of metal at an elevated temperature after the slab is passed from a furnace by passing the slab along a straight line of travel through a multiple stand roughing section and then through a multiple stand finishing section, the improvement characterized by performing the following steps upon occurrence of a malfunction in the process:

preserving the condition of a band during down time of the process upon occurrence of a malfunction by performing the following steps:

lifting the trailing edge of the band from the roughing section at a location upstream from a final roughing stand of said roughing section;

winding the band, trailing edge first, and in a reverse rolling direction along said travel line about a transverse horizontal axis above said travel line of said roughing section to form a coil of the band and thus remove the band from said travel line;

maintaining the formed coil at an elevated temperature during the down time by rotating the coil with respect to spaced heaters;

and, preserving the condition of a slab during down time of the process by performing the following steps upon occurrence of a malfunction:

moving the slab laterally in a horiztontal direction out of the line of travel to remove the slab from the roughing section at a location upstream of the horizontal axis about which the band is wound;

maintaining the slab at an elevated temperature by reciprocating the slab relative to spaced heaters; and returning to the line any band or slab removed from the line after correcting the malfunction whereby processing of the band or slab is continued without degradation thereof due to the malfunction.

2. The process of claim 1 further including the step of storing the coil in a non-reactive atmosphere while maintaining the temperature of the coil.

* * * * *

UNITED STATES PATENT AND TRADEMARK OFFICE
CERTIFICATE OF CORRECTION

PATENT NO. : 4,263,798
DATED : 28 April 1981
INVENTOR(S) : HANS WLADIKA ET AL

It is certified that error appears in the above—identified patent and that said Letters Patent is hereby corrected as shown below:

On the title page, the following should be added:

[30] Foreign Application Priority Data

January 10, 1976 [DE] Fed. Rep. of Germany....2600784

*Signed and Sealed this*

*Fourth* Day of *May 1982*

[SEAL]

*Attest:*

*Attesting Officer*

GERALD J. MOSSINGHOFF
*Commissioner of Patents and Trademarks*